Nov. 3, 1970 S. W. BURCHETT 3,537,155

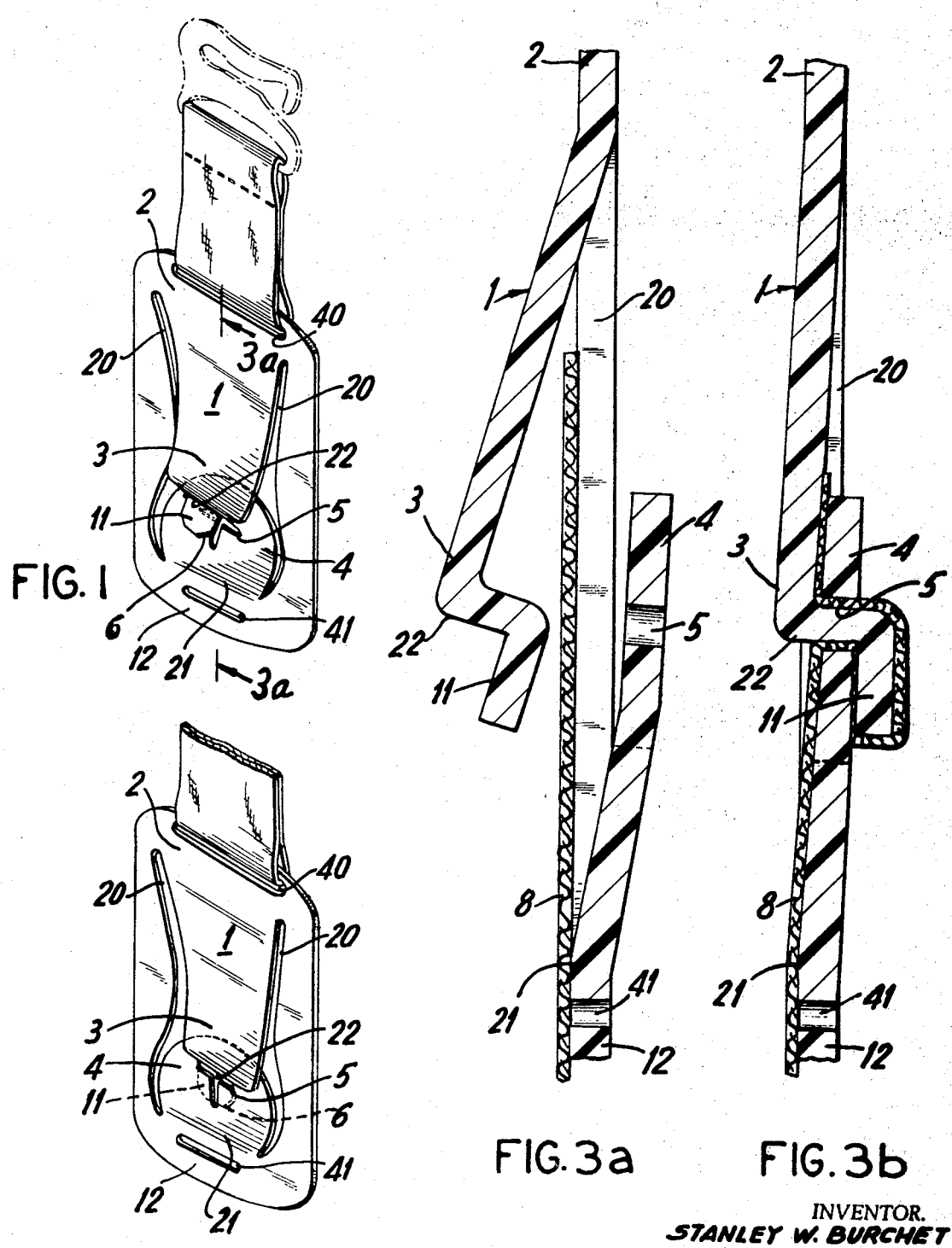

CLASP

Filed Sept. 2, 1969 4 Sheets-Sheet 2

INVENTOR.
STANLEY W. BURCHETT
BY
*Hopgood & Calimafde*
ATTORNEYS

Nov. 3, 1970 S. W. BURCHETT 3,537,155
CLASP
Filed Sept. 2, 1969 4 Sheets-Sheet 3

INVENTOR.
STANLEY W. BURCHETT
BY
Hopgood & Calimafde
ATTORNEYS

United States Patent Office 3,537,155
Patented Nov. 3, 1970

3,537,155
CLASP
Stanley W. Burchett, 16 Academy Lane,
Bellport, N.Y. 11713
Continuation-in-part of application Ser. No. 763,896,
Sept. 30, 1968. This application Sept. 2, 1969, Ser.
No. 854,414
Int. Cl. A41f 11/08
U.S. Cl. 24—245                                    16 Claims

ABSTRACT OF THE DISCLOSURE

My invention relates to an integral essentially one-piece clasp for holding a thin flexible fabric or the like. The body is generally thin, resilient material having spaced apart locking elements for holding the fabric formed at the ends of opposing projections. In a preferred embodiment, the projecting members are separated by a side of the body formed into a thin resilient web.

---

This application is a continuation-in-part of my prior application Ser. No. 763,896, filed Sept. 30, 1968 and now abandoned.

This invention relates to a one-piece lock or clasp for holding thin flexible fabric or the like. More particularly, it relates to a snap lock which may be of molded one-piece plastic or metal construction.

One of the objects of this invention is to provide a snap lock which easily secures itself to knitted, woven or laminated material.

A further object of this invention is to provide a snap lock for material which can support excessive weight or stress to the material.

Still another object of this invention is to provide a simple, thin, one-piece weight lock or clasp which provides a simple open and locking operation.

A primary object of my invention is to repeatedly connect securely and release undamaged, in simple operations, any standard flat, delicate or otherwise, flexible material (knitted, woven, laminated or the like) to a one piece thin, small flat or slightly convex simply manufactured clasp; the opposite end of which is connected to material formed in a loop or a strap, or with buttonholes or loosely stitched for penetration.

Briefly, in my invention I provide a clasp for holding thin flexible fabric or the like made of thin flexible, but substantially resilient material having an integral body. The body is shaped to provide opposed projecting members held in spaced apart relationship by a part of the body material, such as one or two side walls. The projecting element having locking or clasping elements formed therein, such as a tongue and slot, respectively; the tongue forcing the fabric into the slot, the resilient forces acting on the tongue retaining the fabric against the projecting member containing the slot.

The above-mentioned and other features and objects of this invention and the manner of attaining them will become more apparent and the invention itself will be best understood by reference to the following description of the embodiments of the invention taken in conjunction with the accompanying drawings, wherein:

FIG. 1 is a perspective drawing of the snap lock shown in the opening position;

FIG. 2 is a perspective view of the snap lock in the closed position;

FIGS. 3a and 3b are side views in the respective open and closed positions;

FIG. 6b is a sectional view along 6b of FIG. 6a;

FIG. 9 is a modification of the invention of FIG. 8a.

Figure 4:
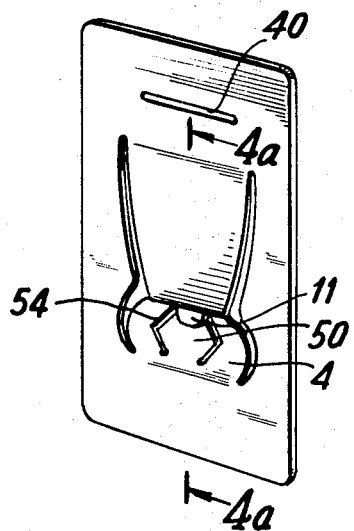
FIG. 4 is a perspective view of another embodiment of my invention.

Referring now to FIG. 1, there is shown my novel clasp in perspective form. The clasp 1 is generally thin and has an upper portion 2 and a lower portion 12 and a first projecting part 3 extending from the top downwardly and a second projecting part 4 extending from the bottom upwardly and towards part 3. The upper and lower portions are actually separated by the entire opening 20 formed in the body. The opening 20 is thus formed between side walls 10, the latter holding the second projecting part 5 in opposing relationship to the first projecting part 3.

Figure 8:
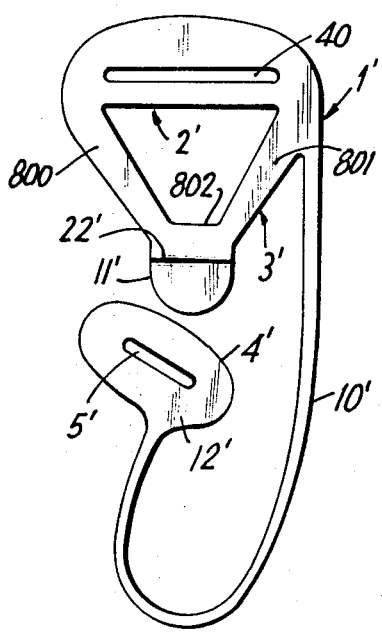
FIG. 8 is a front view of an attenuated and preferred embodiment of my invention in the open position.

It is desirable to temporarily digress to the preferred embodiment of this invention shown in FIGS. 8, 8a–8c. In FIG. 8, there is shown a clasp 1' having an upper portion 2' and a lower portion 12'. The upper portion 2' has a first projecting part 3' extending from the top downwardly and a second projecting part 4' extending from the bottom upwardly towards part 3'. Side wall 10' keeps the projecting parts 3' and 4' in spaced apart relationship. A further detailed description of the embodiment of FIGS. 8, 8a–8c will be given later and its operation will be apparent.

Referring back to FIG. 1, the four parts described 2, 3, 4 and 12, are made integral and comprise only one, thin, piece of material, preferably a relatively flexible plastic.

The two projecting parts overlap and may be locked together in a manner described. Projecting part 3 is elongated and has an end part or tongue 11. Projecting part 4 is essentially separated from the body of the clasp 1 by opening 20. Part 4 is integrally jointed to clasp body 1 at an adjoining region designated generally 21 and is shaped much like a peninsula, three sides being surrounded by the opening 20. Projecting part 4 has included therein a T-shaped slot 5, comprising a female member adapted to interlock with the projecting end 11. FIGS. 3a and 3b are diagrammatic illustrations of the manner by which the material 8 fits between the two projecting elements.

Referring to FIG. 3, it will be seen that the end 11 can be easily secured by slipping the male component over the material 8 and through slot 5 snap locking in place as the walls of the stem of the T spread and the pressure from part 3 against 4 moving 3 approximately 45°. Tongue 11 is parallel to the body portion and projecting part 3, but offset by a perpendicular ridge 22 which fits into slot 5; the perpendicular ridge being shown clearly in FIG. 3a. It will be apparent that this construction provides substantial simplicity and advantages, since it allows for blind one-handed operating capability and utilizes, for example, the thumb and the first two fingers.

Each of the projecting elements may be formed in many different configurations. In the embodiment disclosed, the projecting members, two for each clasp, are similar to small cantilevered elements which project towards each other and each has a certain amount of resilience. When the two elements are snap locked into place and the clasp is applied under tension as the material is pulled, the locking effect is strong, and it will be apparent that a secure fastener will be provided. Projecting part 3 supports the material. As 4 may contribute support also, the material may slip. To prevent 4 from supporting, the walls showed preferably have to be narrow and/or offer very little resistance to stress. Fastening security can be enhanced by using narrower modestly S-shaped side walls that have a slight longitudinal stretch capability.

The body material is flexible and in an embodiment within the principles I have set forth, may also be elastomeric, i.e., stretchy and I do not wish to be limited to any particular material. When the body portion rather than the projections stretch, the interlocking effect may be enhanced.

Figure 4A:
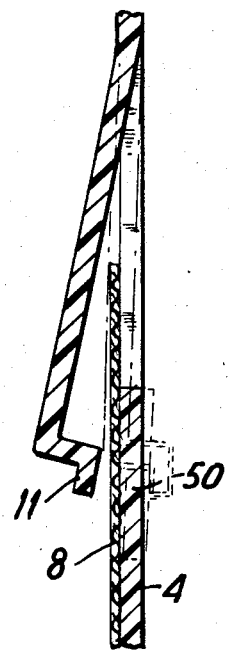
FIG. 4a is a sectional view of the embodiment of FIG. 4.
Figure 4B:
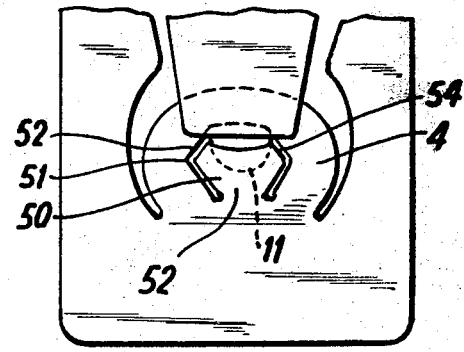
FIG. 4b is an enlarged front view illustrating the locking members.

Referring now to FIGS. 4, 4a and 4b, there is shown another embodiment of this invention. In general, its operation is similar to that of FIG. 1. However, the main cantilevered or projecting part 4 has within it a secondary cantilevered part 50 projecting generally upwards and in the same direction. That is, within the body of cantilevered part 4 there is provided a multisided (included rounding) slot 54 defined between the walls 51 and 52. Walls 51 and 52 are specifically five sided and are cantilevered in a region 52 which is towards the base of the main cantilevered section or part 4. The end engageable part 11 of the lock member 3, when pressed into the locking element, initially depresses the cantilevered section 4 and then secondarily depresses cantilevered section 50. The principal object of 50 is to facilitate simple one-handed release by simultaneously pressing the back of tongue 11 with the forefinger and the front tip of 12 with the thumb. Once part 11 (and material 8) passes through the slot 54, an exceptionally secure locking relationship is obtained. One reason for this is that the engagement between the cantilevered section 50 and part 11 will remain in place, notwithstanding any movement of the main cantilevered part 4.

Figure 5:
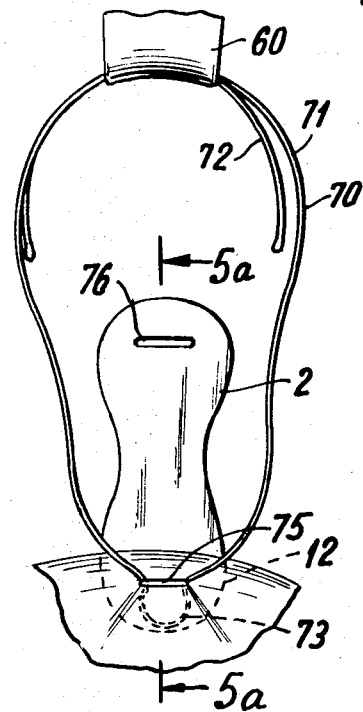
FIG. 5 is a front view of another embodiment of my invention.
Figure 5A:
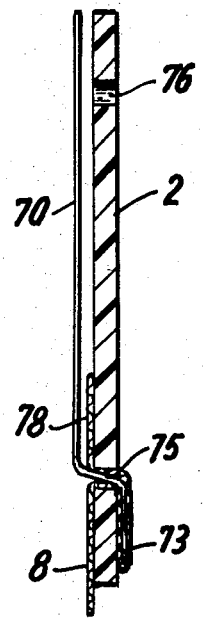
FIG. 5a is a sectional view along 5a of FIG. 5.

In FIGS. 5 and 5a, there are shown another embodiment of this invention. The body member has an upper portion 2 and a lower portion 12 having the engageable slot of a type previously described. Strap 60, which would otherwise pass through slot 40 in the embodiments of FIGS. 1 and 4, now engages part of wire 70 constituting the second part of the clasp. The upper part of wire 70 comprises the two upper sections 71 and 72 which overlap around the upper curvature. These upper sections may be spread to receive strap 60. Wire 70, in its entirety, is shaped as a loop and its bottom-most end is configured to form the outline at 73 of a locking part to fit within the slot 75. The diameter of the slot 75 is less than the diameter of the locking part 73. However, because 73 is formed of wire it can be collapsed in place. In FIG. 5a, the wire 70 is illustrated as fitting within the opening provided at slot 75 and also illustrates the stocking or other fabric 78 secured thereto. It will be noted in FIG. 5, that one slot 76 is not used, but it is available for use if desired. It may be formed to have a different dimension than slot 75 and is therefore available for use in connection with different material constructions and thicknesses.

Figure 6:
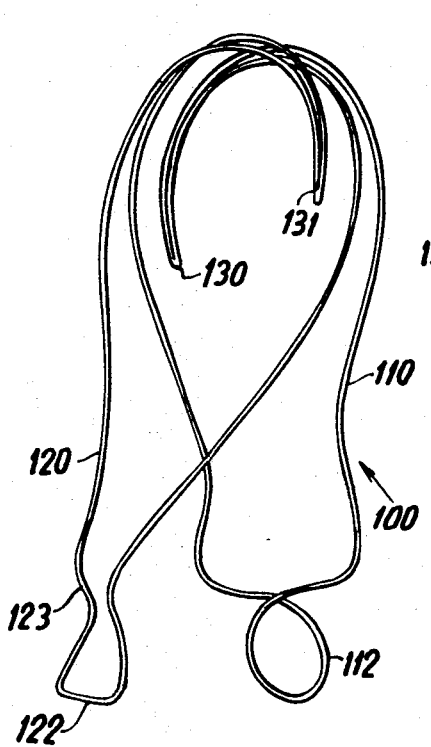
FIG. 6 is a perspective view of a wire embodiment of my invention.
Figure 6A:
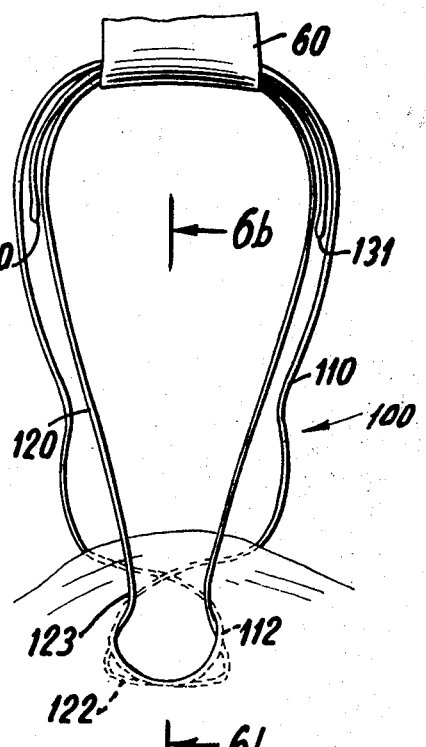
FIG. 6a is a front view of the embodiment of FIG. 6.
Figure 6B:
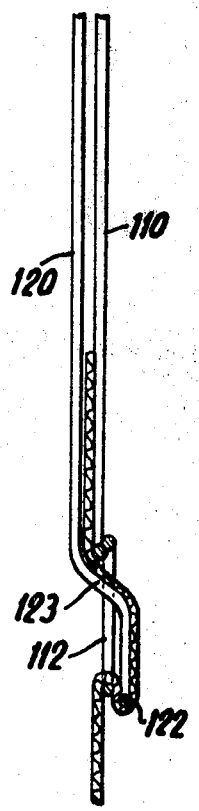

The embodiments of FIGS. 6, 6a and 6b illustrate all wire configurations. Wire 100 is essentially formed from spring wire and comprises two loop sections 110 and 120. These loop sections terminate at their ends 130 and 131 to form one overall integral loop. The end sections may be welded or fused together in any desired manner. Since the ends 130 and 131 are separated, they may be spread apart and inserted within the loop of the strap 60 as suggested in FIG. 6a. The wire itself is essentially springy and the configuration has substantial flexibility so that there is a substantial give in supporting the stocking or other element.

The first loop 110 has a crossed-over bottom defining a subloop 112 which constitutes the female component. The other loop 120 has a slightly recessed section 123 which is shown more clearly in FIG. 6b, and is configurated to provide a locking tab or section 122. The locking element 122 has a diameter which is somewhat greater than that of 112, but the springiness of the wire allows for contraction of the tab 122 so that it can fit within expanding subloop 112 as illustrated in FIGS. 6a and 6b.

Figure 7:
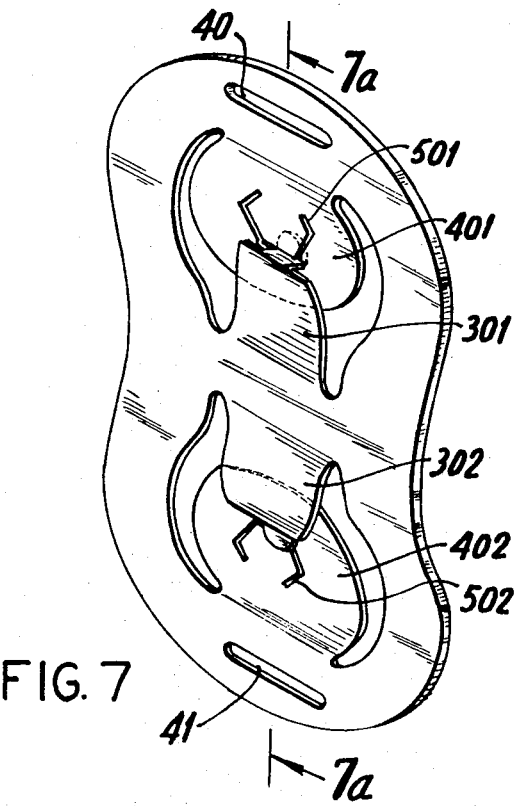
FIG. 7 is a perspective view of another embodiment of my invention.
Figure 7A:
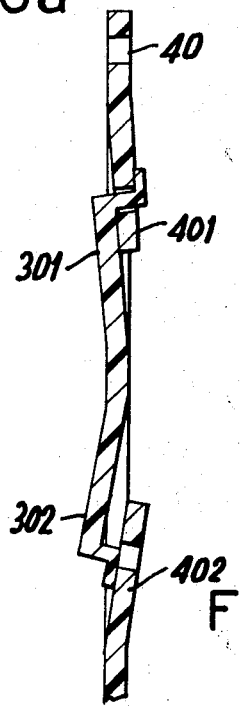
FIG. 7a is a side view along 7a of FIG. 7.

In FIGS. 7 and 7a, there is shown another embodiment in which the body portion is formed of two clasps of the type shown in FIG. 4. On the bottom and top portions there are provided main cantilevered parts 401 and 402 which are formed by cutting or otherwise providing a slot in the body portion. These cantilevered parts project toward each other. At the same time, the main complementary projecting parts 301 and 302 are slotted or cut to form secondary cantilevered parts 401, 402. In this embodiment, the preferred slot is the five-sided slot 501 and 502, the same type of slot being defined by walls 51 and 52, in connection with FIG. 4b. Slots 40 are also provided for the same purpose as in connection with the other embodiments. It will be noted that because of the provision of two engageable clasps, two pieces may be connected together by the interlocking of the respective clasp sections and therefore it is not absolutely necessary to utilize the slots 40.

The clasp may be used for drapery fittings, shower curtain fittings, garment collectors, as well as a garter support. It has the advantage that it can easily support weight with limited stress, that there is no material damage or penetration through a sharp or any other kind of forceful surface, that it provides simple open and locking operation, and is a thin, one-piece member of light weight construction.

Figure 8A:
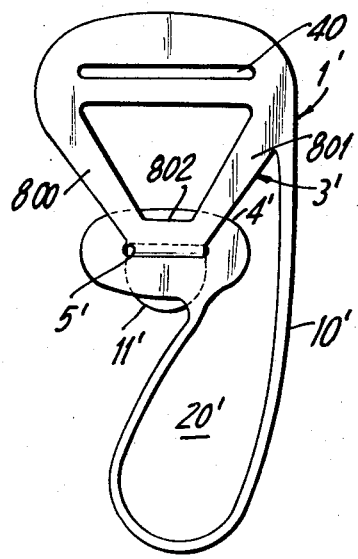
FIG. 8a is a front view of the invention of FIG. 8 illustrated in the locked position.
Figure 8C:
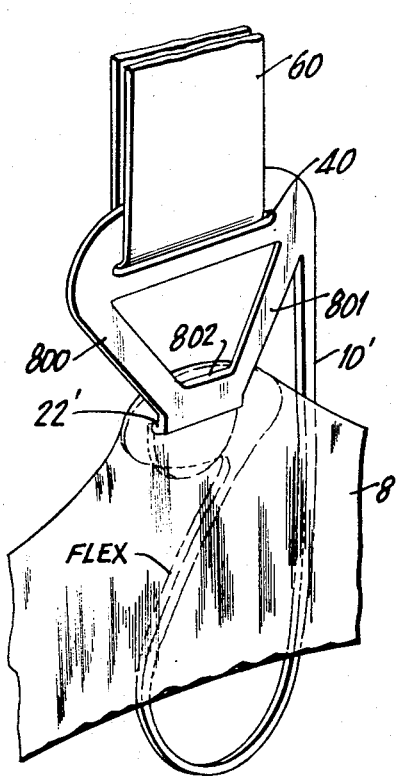
FIG. 8c is a perspective view showing the clasp and fabric in the position of FIG. 8b.
Figure 8B:
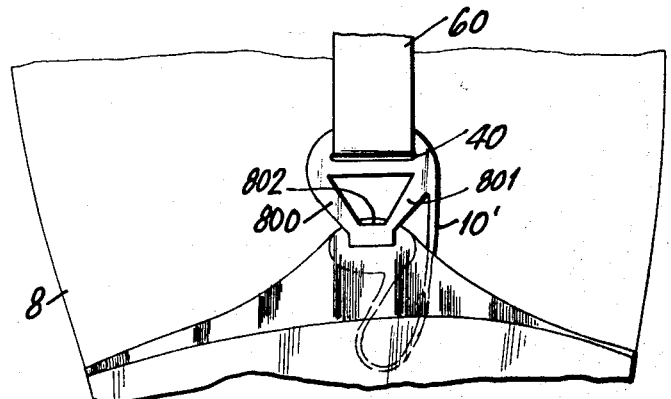
FIG. 8b is a front view similar to FIG. 8a. but illustrating the clasped fabric, here the stocking.

Referring again to the preferred embodiment of the invention shown in FIGS. 8, 8a-8c, the clasp 1' has an upper portion 2' having a projecting part 3' shaped generally as a triangle with sides 800 and 801 which converge at a small bridge section 802 to meet and hold the projecting part 11'. Projecting part 11' has a ridge 22' so that the upper body as well as the projecting parts of 3' are in a different plane than the tongue 11'. This ridge 22 provides the engaging surface when the tongue is held in the slot 5' as illustrated in FIG. 8c.

The lower projecting part 4' is resiliently held in spaced apart relationship by the side wall 10' which comprises a very thin web shaped generally like a J, the projecting part 4' extending from the small side of the J-shaped element. When the part 4' and opening 5' is moved into the position as shown in FIG. 8a, the resilient web or side wall 10' flexes so as to exert a force on the material or the stocking 8 as illustrated in FIG. 8c and the snap locking occurs as described in connection with FIGS 3a and 3b. The material is pulled on top of part 4' and 10' underneath 3' and held in place while 4' is rotated about 60 degrees, pulled toward part 3' forcing tongue 11 and its surrounding material to penetrate opening 5'. Reversal of part 4's rotation leaves it resting on ridge 22' and locking occurs. As material stress is increased its position the ridge becomes proportionally more secure and accidental release of material becomes impossible without structural failure.

It will be noted in FIG. 8a that an opening 20' is formed between the side walls of the J which are substantially the same as the side walls of the lower portion illustrated in FIG. 1. Because of the downward pull exerted on the lower projecting part 4' by the flexed side wall, as well as the downward force normally provided by the fabric of the stocking, a locking engagement occurs. All sheer nylon stockings possess a top part knit with heavier yarn and doubled over, called the "welt" and this welt is illustrated at 810 (FIG. 8b) locked in place.

Figure 9:
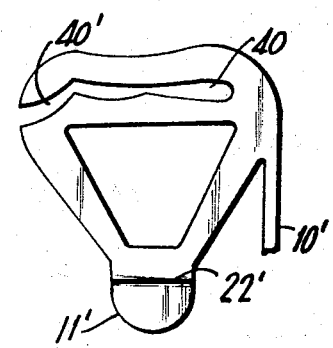

In FIG. 9, the slot is opened on one side 40' to facilitate engagement with strap 60. If desired, the tongue 11' may be circular, elliptical or may have other shapes as will occur to those skilled in the art.

The construction disclosed in FIG. 8 is preferably made of metal, but may also be made of any other flat, substantially flexible but still rigid flat body which can provide the necessary support. An important advantage of the embodiment of FIG. 8 is the ease by which it can be manufactured either by stamping or molding.

Figures 10, 10A:
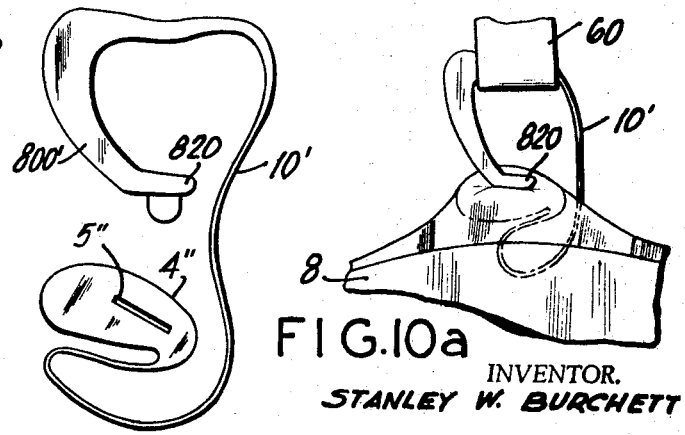
FIGS. 10 and 10a are modifications of FIG. 8.

Referring to FIGS. 10 and 10a, the sidewall 10' has a pronounced curvature as illustrated at 830 and curves back upon itself to terminate with projecting part 4'. The tongue 3' has a lateral locating extension 820 which assists in locking as it extends beyond the slot as well as gripping.

In all of the embodiments, the parts are easily released. FIGS. 1, 4, and 7, illustrate a "punch-out" technique where the tongue is pushed out of the slot without part 4' being depressed. In FIGS. 5, 6, 8, 9, 10, the tongue leaves the slot in the same order in which it entered. In FIG. 8, for example, when rotation or part 4 reaches about 60 degrees, release occurs. In all designs, disengagement is a one-handed operation, engagement is two-handed, because the material has to be held in place with one hand while closing action is effected with the other.

While the foregoing description sets forth the principles of the invention in connection with specific apparatus, it is to be understood that this description is made only by way of example and not as a limitation of the scope of the invention as set forth in the objects thereof and in the accompanying claims.

What is claimed is:
1. A clasp for holding a thin, flexible fabric or the like comprising:
   a substantially stiff body of generally thin material;
   said body having an upper projecting member extending from the top downwardly;
   a lower projecting member;
   said projecting members having sections positionable in overlapping relationship;
   and complementary locking means formed on the overlapping sections of the two projecting pieces.

2. The clasp of claim 1 in which the lower projecting member extends from the bottom upwardly, and in which said locking means includes a T-shaped slot formed in one of the projecting members and a depending tongue in the other to fit into and through said slot.

3. The invention of claim 2 in which the body portion includes narrow side walls.

4. The invention of claim 3 in which the body portion is made of stretchy material.

5. The invention of claim 1 in which the lower projecting member extends from the bottom upwardly, and in which the body portion includes narrow side walls.

6. The invention of claim 5 in which the body portion is made of stretch material.

7. The clasp of claim 1 in which the lower projecting member extends from the bottom upwardly, and in which said lower projecting part includes a secondary projecting part formed by a multisided slot in said lower projecting part.

8. The clasp of claim 1 in which the body material of at least one of the projecting members is wire.

9. The clasp of claim 1 in which the entire clasp is made of wire.

10. The clasp of claim 1 in which the lower body depends from the upper body by a single thin flexible side wall.

11. The clasp of claim 10 in which the upper projecting member has a tongue and a lower projecting member having a tongue receiving slot constituting the locking means, the parts being positionable in over lapping locking relationship.

12. The clasp of claim 11 in which the entire clasp is a thin unitary body having the parts thereof made from a single stamping operation.

13. The clasp of claim 11 in which the upper body has two side walls forming the sides of the upper projecting member, the two side walls converging to support the extending tongue.

14. The clasp of claim 11 in which the tongue has a lateral locating extension.

15. A clasp for holding a thin, flexible fabric or the like comprising:
   a substantially flat body member having an upper region and a lower opposed region;
   said body having a first receiving projecting member cantilevered from said upper region downwardly, and a second receiving projecting member having sections positionable from the lower region upwardly;
   each of said first and second projecting members having slotting sections defining secondary projecting members;
   first and second complementary projecting members each having an overlapping region with respective receiving members;
   and complementary locking means formed on the overlapping sections of the two projecting pieces.

16. The clasp of claim 15 in which said locking means includes the secondary projecting members.

References Cited
UNITED STATES PATENTS

| | | | |
|---|---|---|---|
| 347,871 | 8/1886 | Clarke. | |
| 578,272 | 3/1897 | Scully | 24—245 |
| 2,430,928 | 11/1947 | Gore | 24—246 |
| 3,127,656 | 4/1964 | Schwabe et al. | 24—246 |
| 3,346,928 | 10/1967 | Lambers | 24—245 |

FOREIGN PATENTS

| | | |
|---|---|---|
| 611,935 | 7/1926 | France. |
| 949,380 | 2/1949 | France. |

DONALD A. GRIFFIN, Primary Examiner